United States Patent
Winland et al.

(10) Patent No.: US 11,255,773 B1
(45) Date of Patent: Feb. 22, 2022

(54) SYSTEMS AND METHODS FOR PHASED ARTICLE INSPECTIONS

(71) Applicant: CAASTLE, INC., New York, NY (US)

(72) Inventors: Lindsey Winland, Dublin, OH (US); Jessica Guertin, Grove City, OH (US); Steven Shimozaki, Sunnyvale, CA (US); Mahan Saalabi, San Jose, CA (US)

(73) Assignee: CaaStle, Inc., New York, NY (US)

(*) Notice: Subject to any disclaimer, the term of this patent is extended or adjusted under 35 U.S.C. 154(b) by 0 days.

(21) Appl. No.: 17/109,909

(22) Filed: Dec. 2, 2020

(51) Int. Cl.
| | | |
|---|---|---|
| *G01N 19/08* | (2006.01) | |
| *G06Q 50/04* | (2012.01) | |
| *G06T 7/00* | (2017.01) | |
| *G06Q 10/06* | (2012.01) | |

(52) U.S. Cl.
CPC ....... *G01N 19/08* (2013.01); *G06Q 10/06316* (2013.01); *G06Q 50/04* (2013.01); *G06T 7/0004* (2013.01)

(58) Field of Classification Search
CPC .. G01N 19/08; G06Q 10/06316; G06Q 50/04; G06T 7/0004
See application file for complete search history.

(56) References Cited

U.S. PATENT DOCUMENTS

| | | | |
|---|---|---|---|
| 10,502,691 B1* | 12/2019 | Packard | G01N 21/8803 |
| 10,902,510 B2* | 1/2021 | Singh | G06Q 10/087 |
| 2003/0163219 A1* | 8/2003 | Flesher | G09B 19/003 |
| | | | 700/185 |
| 2006/0170913 A1* | 8/2006 | Burke | D06F 35/00 |
| | | | 356/244 |
| 2017/0323264 A1* | 11/2017 | Subramanian | G06Q 10/083 |

OTHER PUBLICATIONS

"Garment E-commerce Return and Exchange 4PL Innovation", S Jingye, X Shang . . .—DEStech Transactions on . . . , 2019—dpi-proceedings.com (Year: 2019).*

"The optimization of repair decision using life-cycle cost parameters", LL Barros—IMA Journal of Management Mathematics, 1998—ieeexplore.ieee.org (Year: 1998).*

(Continued)

*Primary Examiner* — Jonathan G Sterrett
(74) *Attorney, Agent, or Firm* — Bookoff McAndrews, PLLC (57) ABSTRACT

A computer-implemented method includes receiving one or more articles at an inspection station that includes an inspection processor, inspecting the one or more articles in view of at least one repairability criterion presented via one or more graphical elements, and updating an inspection database if the one or more articles fails the at least one repairability criterion. The method includes inspecting the one or more articles in view of at least one local repair criterion presented via one or more graphical elements, inspecting the one or more articles in view of at least one inspector-driven criterion presented via one or more graphical elements, the action type including at least one of determining an inspection failure or a passed inspection, and updating inspection history data stored in an inspection database in communication with the inspection processor based on the at least one repairability criterion, local repair criterion, or inspector-driven criterion.

20 Claims, 5 Drawing Sheets

(56) References Cited

OTHER PUBLICATIONS

Creating the Painless Inspection Station: Reduction in cumulative trauma disorders convinces managers to phase in new workstations ME Benden—Ergonomics in Design, 1994—journals.sagepub.com (Year: 1994).*

A framework for reverse logistics MP De Brito, R Dekker—Reverse logistics, 2004—Springer (Year: 2004).*

Gwynnie Bee is bringing subscription clothing rental to traditional retailers with launch of 'CaaStle', Mar. 22, 2018, retrieved from the web at: (Year: 2018).*

[Item U continued]https://techcrunch.com/2018/03/22/gwynnie-bee-is-bringing-subscription-clothing-rental-to-traditional-retailers-with-launch-of-caastle/?utm_campaign=Feed%3A.*

"Designing of Manual workstation structure with emphasis on ergonomics", A Lesková—Acta Technics Corviniensis-Bulletin of Engineering, 2014—scts.fih.upt.ro (Year: 2014).*

Inspection planning for customer-driven manufacturing environments with modular inspection stations S Dsvrsjh, G Bright—2014 IEEE/ASME International . . . , 2014—ieeexplore.ieee.org (Year: 2014).*

\* cited by examiner

SYSTEMS AND METHODS FOR PHASED ARTICLE INSPECTIONS

TECHNICAL FIELD

The present disclosure relates generally to the field of processing an article for an end user and, more particularly, to systems and methods for inspections of articles.

BACKGROUND

The clothing and fashion industry has traditionally depended on a business model where customers purchase goods from physical retail locations. These goods are frequently discarded by the customer while the item remains in good condition or even excellent condition. Numerous retail locations are necessary to attract customers and provide sufficient space for the display of items and to stock items of different styles, sizes, etc. These physical retail locations are operated by teams of employees and are both labor-intensive and expensive to maintain. Additionally, each physical location can only attract consumers within a narrow geographic area. It is also expensive and difficult to adapt multiple retail locations to rapidly-changing trends.

Although many industries have successfully migrated to internet-connected platforms, the fashion or clothing industries largely remain dependent on physical retail stores and traditional business models. Even when a sale of an item, such as clothing, is performed over the Internet, the item may still be used infrequently by a single consumer before being discarded. Thus, the fashion and clothing industries, as well as numerous other industries, produce a significant amount of waste. Accordingly, there is a need to transition to more efficient practices.

Various challenges face retailers seeking to transition to alternate strategies that provide items for short-term or temporary use. One such challenge lies in managing inbound articles for inspection, maintenance, cleaning, research, or stocking, and accumulating useful data based on the result of each activity. Current rental services inspect items in a cursory manner, if inspection is performed at all. Even when a more detailed inspection is performed, data associated with the result of the inspection are not recorded. There is a need for systems and methods to inspect an article, such as an article of clothing, provided for multiple end users, and to evaluate information during and after the inspection. Furthermore, as vast amounts of information may be collected in numerous different categories, there is a need for systems and methods that facilitate data recordation. Thus, the present disclosure is directed to processing an article for an end user and, more particularly, to systems and methods for tracking and performing inspections for articles provided to multiple end users.

SUMMARY OF THE DISCLOSURE

According to certain aspects of the disclosure, systems and methods are disclosed to perform article inspections. The methods and systems disclosed herein may overcome or alleviate issues and problems mentioned above. For example, the methods and systems disclosed herein may facilitate performance of article inspections in an accurate, trackable, and repeatable manner. This may be achieved by performing at least part of an inspection with an inspection processor and/or by evaluating retirement, repairability, and/or inspector-driven criteria efficiently, e.g., in a predetermined order. For example, an inspection processor may be configured to guide inspections of articles through a plurality of phases, which may facilitate the efficient and accurate completion of a multi-point (e.g., 14-point) inspection.

In one aspect, a computer-implemented method for dynamically managing inspection data may include receiving one or more articles at an inspection station that includes an inspection processor, inspecting the one or more articles in view of at least one repairability criterion presented via one or more graphical elements, and inspecting the one or more articles in view of at least one local repair criterion presented via one or more graphical elements. The method may also include inspecting the one or more articles in view of at least one inspector-driven criterion presented via one or more graphical elements, determining an action type for the one or more articles, based on the at least one the local repair criterion or the at least one inspector-driven criterion, the action type including at least one of determining an inspection failure or a passed inspection, and updating inspection history data stored in an inspection database in communication with the inspection processor based on one or more of the at least one repairability criterion, the at least one local repair criterion, or the at least one inspector-driven criterion.

In another aspect, a computer system for dynamically managing data associated with inspections of one or more articles may include a memory having processor-readable instructions stored therein and at least one processor configured to access the memory and execute the processor-readable instructions, which when executed by the at least one processor configures the at least one processor to perform a plurality of functions. The functions may include presenting one or more graphical elements to guide an inspection of the one or more articles in view of at least one repairability criterion presented via the one or more graphical elements, presenting one or more graphical elements to guide an inspection of the one or more articles in view of at least one local repair criterion presented via the one or more graphical elements, and presenting one or more graphical elements to guide an inspection of the one or more articles in view of at least one inspector-driven criterion presented via the one or more graphical elements. The functions may also include determining an action type for the one or more articles, based on the at least one the local repair criterion or the at least one inspector-driven criterion, and updating inspection history data stored in an inspection database in communication with the inspection processor based on one or more of the at least one repairability criterion, the at least one local repair criterion, or the at least one inspector-driven criterion.

In yet another aspect, a non-transitory computer-readable medium may contain instructions for dynamically managing data associated with inspections of articles, the instructions, when executed by a processor, causing the processor to perform steps including presenting one or more graphical elements to guide an inspection of the one or more articles in view of at least one repairability criterion and presenting one or more graphical elements to guide an inspection of the one or more articles in view of at least one local repair criterion. The steps may also include presenting one or more graphical elements to guide an inspection of the one or more articles in view of at least one inspector-driven criterion, determining an action type for the one or more articles based on the at least one the local repair criterion or the at least one inspector-driven criterion, and updating inspection history data stored in an inspection database in communication with the inspection processor based on one or more of the at least one repairability criterion, the at least one local repair criterion, or the at least one inspector-driven criterion.

It is to be understood that both the foregoing general description and the following detailed description are exemplary and explanatory only and are not restrictive of the disclosed embodiments, as claimed.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of system and method for article inspection and management.

As described above, there is a need in the field of article processing to more accurately inspect the condition of a large number of articles that are provided to one or more end users and to update a centralized archival of data pertaining to the articles and inspections thereof.

Figure 1:
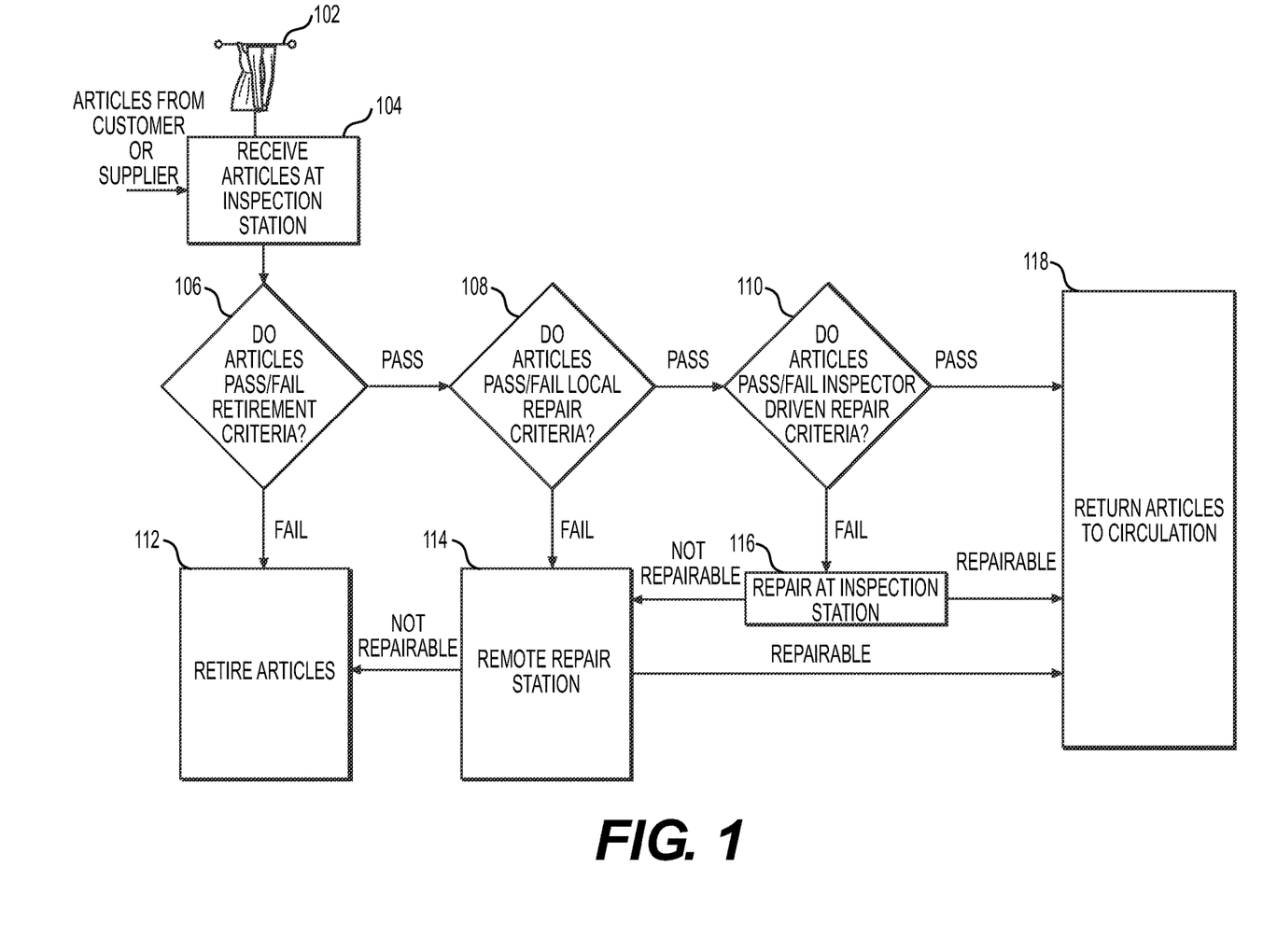
FIG. 1 is a schematic diagram of a workflow applicable to a service of providing articles including an inspection system according to an embodiment of the present disclosure.

FIG. 1 illustrates an exemplary workflow that may be applied to a service of providing articles to end users (e.g., articles as a service). The articles are, in a particular example, garments (e.g., clothing and/or jewelry) and accessories that are provided as a service to numerous subscribing users. As shown in FIG. 1, one or more articles 102 are received at an inspection station 104. Once the one or more articles 102 are received at the inspection station, determinations can be made as to whether the one or more articles 102 pass various inspection criteria. For example, an exemplary initial determination can be whether one or more articles pass or fail salvageability (e.g., repairability) or retirement criteria 106. In evaluating whether one or more articles 102 pass or fail retirement criteria 106, a determination is made, for example with an inspection processor, as to whether the one or more articles 102 has irreparable damage (e.g., a tear, a hole in a location other than along a seam, colorfade, excessive pilling/wear, runs or snags, shrinkage, poor elasticity, etc.), such that the one or more articles 102 should be retired and removed from circulation. If it is determined that the one or more articles 102 are not irreparably damaged, the one or more articles 102 may pass the retirement criteria 106 determination. Alternatively, if it is determined that the one or more articles 102 fail retirement criteria 106 the one or more articles may be retired 112 and removed from circulation.

In the event the one or more articles 102 pass the retirement criteria 106, the one or more articles 102 may be evaluated against a plurality of local repair criteria 108. In evaluating whether one or more articles 102 pass or fail local repair criteria 108, a determination may be made, by for example an inspection processor, as to whether the one or more articles 102 has locally repairable damage (e.g., tear on a seam, stain or dirt spot, generally dirty, has embellishment, color bleeding, wrinkled, or has an odor) that can be repaired on-site, or has no damage at all. If it is determined, with an inspection processor, that the one or more articles 102 pass the local repair criteria 108 (e.g., inspector-driven damage is detected or no damage is detected), a suitable action type may be performed. In particular, the one or more articles 102 may be repaired locally (e.g., on-site at a location other than the inspection station) or returned to circulation, when the one or more articles pass the local repair criteria 108 determination. Alternatively, if it is determined that the one or more articles 102 fail the local repair criteria 108 and therefore are repairable, but not at an inspection station, then the one or more articles 102 are sent to a remote repair station 114 (e.g., a repair station located on-site with the inspection station). If the one or more articles 102 can be repaired at the remote repair station 114, then the one or more articles are returned to circulation 118 following such repair. However, if the one or more articles 102 cannot be repaired at the remote repair station 114, then the one or more articles 102 may be retired (e.g., removed from circulation).

When the one or more articles 102 pass the local repair criteria 108, the one or more articles 102 are evaluated against inspector-driven repair criteria 110. In evaluating whether one or more articles 102 pass or fail inspector-driven repair criteria 110, a determination is made, with an inspection processor, as to whether the one or more articles 102 has minor damage (e.g., pilling, loose threads, zipper or clasp damage, popped seams, lint, small snag, etc.) that is repairable locally at an inspection station, or has no damage at all. If it is determined, with the inspection processor, that the one or more articles 102 have no damage to repair, then the one or more articles 102 pass the inspector-driven repair criteria 110 determination and are returned to circulation 118. Articles 102 that are returned to circulation 118 may be placed in a predetermined location within a warehouse (e.g., on site at a location where the inspection was performed, or at a remote location) or provided to shipment to one or more subscribing users that receive one or more articles 102 as a service. Alternatively, if it is determined that the one or more articles 102 fail one or more inspector-driven criteria 110, a suitable action type (e.g., an inspector-driven repair) may be performed. In particular, the one or more articles 102 may be repaired at inspection station 116 (e.g., at the inspection station where the inspection was performed with the inspection processor). Following this repair, the one or more repaired articles 102 may be returned to circulation 118. If, however, the repair is unsuccessful, the one or more articles 102 may be transferred to a remote repair station 114 or retired 112.

Figure 2:
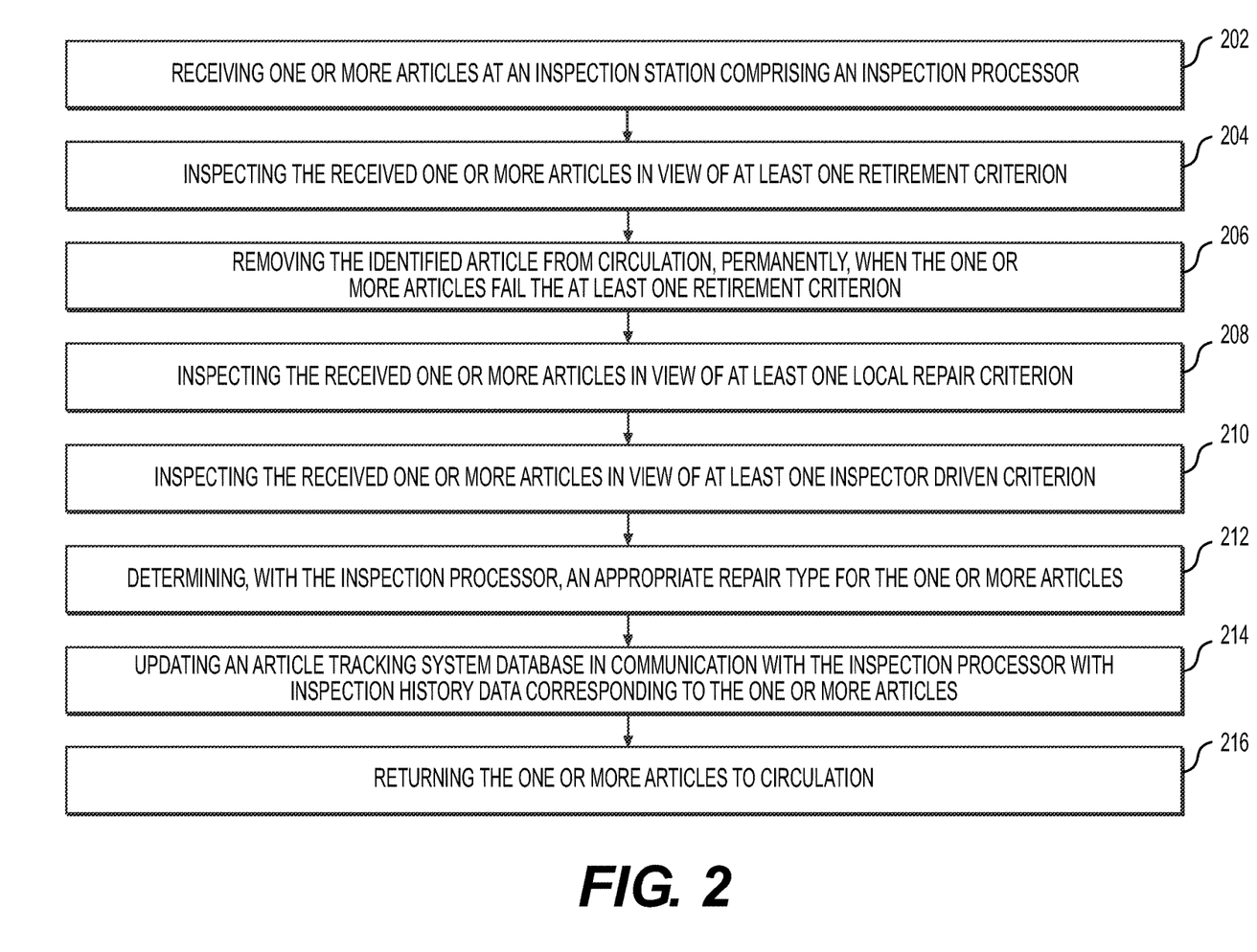
FIG. 2 is a flow diagram illustrating an inspection process according to an embodiment of the present disclosure.

FIG. 2 depicts a flow diagram illustrating an inspection process according to an embodiment of the present disclosure. As can be seen in FIG. 2, one or more articles 102 may be received at an inspection station comprising an inspection processor (Step 202). For example, one or more articles (e.g., wearable items such as garments, jewelry, and/or accessories) are received at an inspection area (e.g., within a warehouse) and transferred to one or more inspection stations that each include a respective inspection processor, an exemplary configuration of which is described below. Once articles 102 are received, the articles are inspected in view of at least one repairability, or retirement, criterion (Step 204). In Step 204, an inspection processor may facilitate inspection of the one or more articles in view of retirement criteria to determine whether the one or more articles 102 has irreparable damage (e.g., a tear, a hole other than along a seam, color fade, excessive pilling/wear, runs or snags, shrinkage, or poor elasticity), such that the one or more articles 102 should be removed from circulation. The one or more articles 102 may be permanently removed from circulation in a Step 206, based on the determination that the one or more articles 102 failed the at least one retirement criterion.

If the one or more articles 102 pass the retirement criterion, then the one or more articles 102 may be evaluated in view of at least one additional criterion. For example, based on a determination, via the inspection processor, that the received one or more articles 102 pass the at least one retirement criterion, the articles 102 may be inspected in view of at least one local repair criterion (Step 208). Exemplary local repair criteria may include, for example, whether the one or more articles has locally repairable damage (e.g., a tear on the seam, a stain or dirt spot, the article is generally dirty, the article has an unintended embellishment or is missing a replaceable embellishment, hardware such as a button or zipper is missing or damaged, color bleeding, is wrinkled, or has an odor). For example, Step 208 may include evaluating, with the inspection processor, whether the one or more articles are repairable locally at an inspection station, or the article has no damage. If the one or more articles 102 has damage, but that the damage cannot be repaired at an inspection station, the one or more articles 102 may be transferred to a remote repair station (e.g., a station for spotting treatment, wet cleaning station, dry cleaning station, a steam tunnel, a garment press, a tailoring or seam-repair station, etc.). If the one or more articles do not have damage necessitating transfer to a remote repair station, and therefore pass the local repair criterion, the one or more articles 102 may be inspected in view of at least one additional criterion. For example, when the one or more articles 102 pass or meet local repair criteria, the received one or more articles 102 may then be inspected in view of at least one inspector-driven criterion (Step 210).

Step 212 may include determining, with the inspection processor, an appropriate repair type for the one or more articles based on the result of Steps 208 and 210. However, Step 212 may be performed, in at least some circumstances, based on the result of step 208 and, if desired, without performing Step 210 (e.g., when the one or more articles fails the at least one local repair criterion). Step 212 may also be performed following Step 210, based on the determination that the one or more articles 102 fails one or more inspector-driven repair criteria. For example, Step 212 may include, upon determining that the one or more articles fail one or more inspector-driven criteria, determining the appropriate repair type to perform one or more inspector-driven repair services (e.g., removing loose threads, securing a clasp to a zipper, fixing a popped seam, removing lint, repairing a small snag, and/or other actions) to restore the article to a state that passes these criteria. If, during Step 212, inspector-driven repair services are unnecessary, no service may be performed, and the one or more articles 102 may be returned to circulation 118. This may be performed with the inspection processor, for example. In Step 212, if the inspection processor determines that the one or more articles 102 fail the inspector-driven criterion and the inspector-driven repair service is unsuccessful, the inspection processor may further determine that the appropriate repair type based on the identified damage and implement processes for repairing the one or more articles 102.

To facilitate one or more of Steps 204, 208, 210, and 212, an inspection processor may present a series of prompts to guide a multi-phase inspection of the one or more articles 102. An operator, such as an inspector, may provide results of each phase and/or individual criterion, by interacting with the inspection processor which may provide direction for each of the different inspection phases (Steps 204, 208, and 210) and/or display an action that should be taken based on the outcome of one or more of these phases (Step 212). The inspection processor may also update an article tracking system database in communication with the inspection processor. This may include modifying, creating, or otherwise updating inspection history data corresponding to the one or more articles (Step 214) based on the results of each of the above-described Steps 204, 206, 208, 210, and 212.

Upon determining that the one or more articles have been repaired or have passed all inspection criteria with the inspection processor, the one or more articles 102 may be returned to circulation in a Step 216 (except for any articles that were determined to be retired in Step 204).

While method 200 may be useful for performing routine (e.g., ongoing) inspections for a service that provides articles 102 for temporary use by one or more subscribing users, method 200 may also be useful for performing training of new inspectors. For example, method 200 may be used to present prompts in a predetermined order to train an inspector to perform inspections based on historical inspection data. In order to do so, an inspection processor 320 may present prompts that perform a multi-phase inspection, as described below. In a first phase, the inspector may be guided to perform inspections for retirement criteria in sequence, beginning with the most frequent reasons for a failed inspection. At the completion of the first phase, inspection processor 320 may guide the inspector through a second phase. Similarly, inspection processor 320 may guide the inspector through a third phase after the completion of the first and second phases. While inspection processor 320 may be configured to dynamically update the order of criteria that are evaluated in each phase, the order of the phases may be constant over time.

Figure 3:
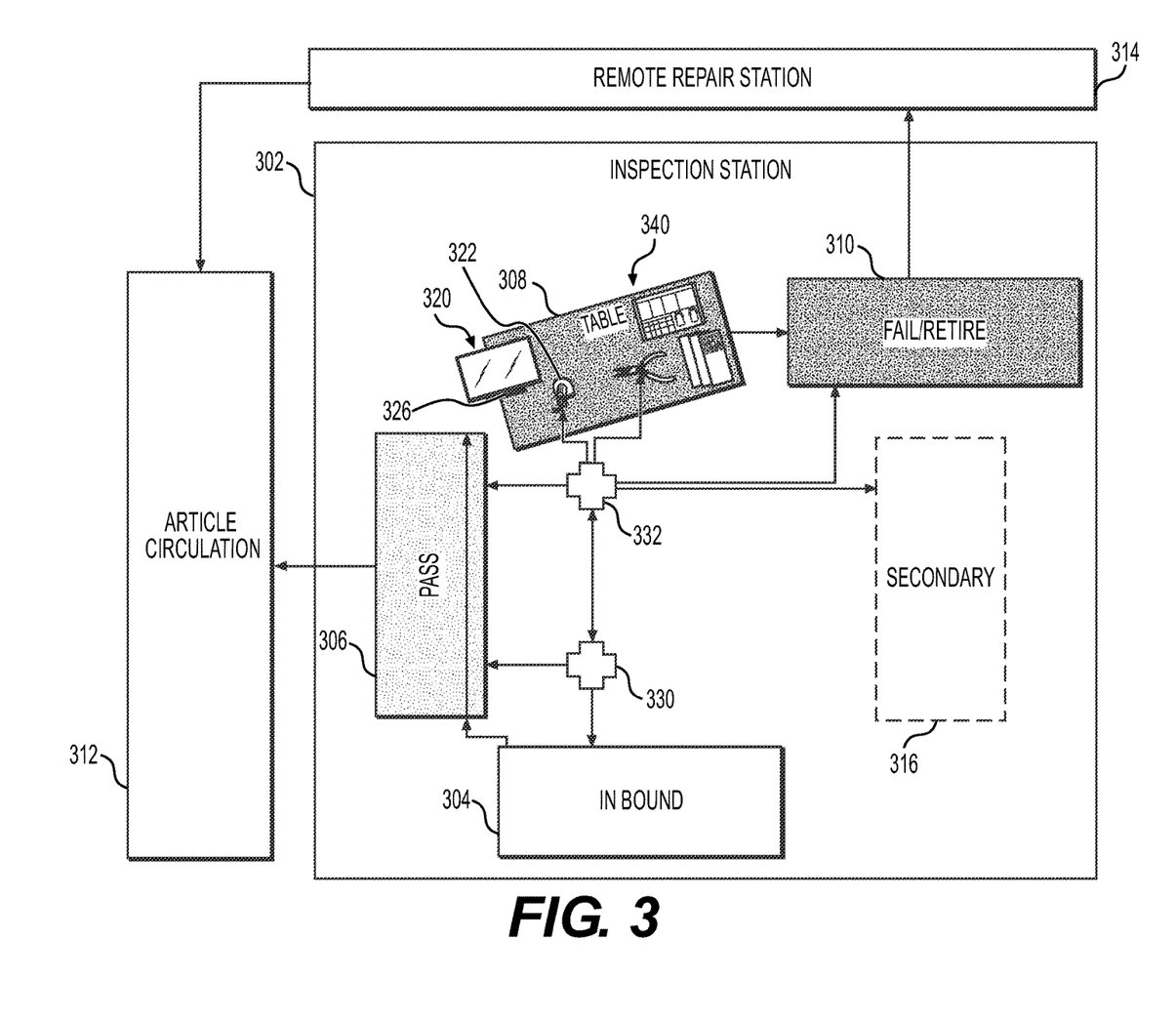
FIG. 3 is a diagram illustrating an inspection system including an inspection station, according to an embodiment of the present disclosure.

FIG. 3 is block a diagram illustrating an inspection system, including an inspection station 302, according to an embodiment of the present disclosure. The inspection system may be optimized for automating the process of receiving, inspecting, and preparing articles for circulation. Inspection station 302 may include one or more spaces, lanes, or other designated structures or areas for receiving one or more articles 102 (e.g., articles 102 secured on one or more racks). For example, inspection station 302 may include one or more inbound stations 304. Inspection station 302 may include one or more pass stations 306 for storing articles 102 that pass inspection and/or for temporarily storing articles 102 during an inspection. Pass station 306 may be configured for receiving one or more articles that were determined to pass one or more inspection criteria (e.g., retirement criteria, local repair criteria, and/or inspector-driven repair criteria). Inspection station 302 may include one or more operator stations or tables 308 including equipment suitable for performing inspections and, if desired, minor repairs on articles 102. For example, operator's table 308 may include an inspection processing device or inspection processor 320 (e.g., a computer/server comprising memory, a processor, touchscreen display, additional I/O devices such as a mouse or keyboard may also be included in display, a wired or wireless network interface configured to access a network 504), a reader 322 that is configured to read unique article identifiers such as identifier 324 (FIG. 5), and inspection equipment 340 (e.g., shaving device, lint brush, cutting tool, pliers, inspection tool, action tags, spot stickers, production worksheet, fail plates, cashmere brush, safety pins, a pen, and tickets for indicating where repair and spotting treatment is required). Inspection processor 320 may include a pivotable and/or telescopic mount 326 on which an inspection-guidance device of inspection processor 320, such as a display, touch-screen display, etc., is secured.

In at least some embodiments, inspection station 302 may be configured in a manner that accelerates inspections and reduces the amount of physical movement (e.g., of articles 102 and/or of an operator) that is necessary during the inspection process. Inspection station 302 may include a first position 330 from which the inbound station 304 and pass station 306 are each accessible. A second position 332 of inspection station 302 may facilitate interaction with inspection processor 320 and one or more articles 102 located in pass station 306.

Pivotable mount 326 may secure a device, such as a monitor, touchscreen device, etc., configured to guide an operator through a multi-phase inspection of one or more articles 102 as described herein. As shown in FIG. 3, pivotable mount 326 may be secured to an edge of table 308 adjacent to a leading edge of pass station 306. In one aspect, articles 102 at pass station 306 may be transported toward a front of pass station 306 (a location indicated by the arrow within pass station 306). Thus, articles 102 may be positioned in proximity of reader 322 and inspection processor 320. If desired, pivotable mount 326 may be configured to raise, lower, extend, and rotate (e.g., about a vertical axis) a display of inspection processor 320, to allow at least a portion of the display of inspection processor 320 to be positioned between table 308 and a front portion of pass station 306. Thus, articles 102 at a front of pass station 306, reader 322, and inspection processor 320 may each be accessed from a second inspector position 332.

Inspection processor 320 may be configured to guide an inspector through a multi-phase inspection and/or for training an operator (e.g., an inspector) to perform multi-phase inspections by presenting a series of prompts and receiving inputs for one or more of these prompts. For example, a display of inspection processor 320 may present a series of prompts to ensure that an order of operations is followed during the inspection. In particular, inspection processor 320 may present a first set of prompts indicative of one or more retirement criteria, a second set of prompts indicative of one or more local repair criteria, and a third set of prompts indicative of one or more inspector-driven repair criteria. For example, inspection processor 320 may present individual prompts for each of the retirement, local repair, and inspector-driven repair criteria. In order to generate inputs representative of inspection results for each of these criteria, inspection processor 320 may present graphical elements that a user may interact with (e.g., touchscreen buttons, radio buttons, checkboxes, or other buttons or selections). If desired, inspection processor 320 may display a series of codes corresponding to potential inspection outcomes that are readable by reader 322 (e.g., barcodes, QR codes, etc.). Thus, an inspection result for each individual criterion (e.g., a pass or fail) may be entered by reading a code with reader 322. If desired, these codes may be secured to a surface of operator's table 308 or another suitable location within inspection station 302.

As shown in FIG. 3, inbound station 304 and pass station 306 may be positioned with an approximately 90 degree offset with respect to each other. As part of an inspection process an operator may withdraw articles from inbound station 304 and place these articles (e.g., about 50% of the articles at station 304) to pass station 306. These articles 102 may be drawn to the front of pass station 306 adjacent to table 308. Operator's table 308 may be obliquely angled with respect to pass station 306 such that an edge of table 308 to which mount 326 is secured faces one or more articles 102 located at pass station 306. This configuration may ensure that articles 102 are located proximate to inspection processor 320 and reader 322. In particular, a second position 332 may form an angle of between about 60 degrees and about 90 degrees between pass station 306 and one or more components of inspection processor 320 (e.g., a display of processor 320). Inspection equipment 340 may be secured on another portion of table 308 such that an operator facing pass station 306 may access equipment 340 by turning within a range of about 100 degrees to about 140 degrees (e.g., about 120 degrees). Positions facing pass station 306 and facing fail/retire station 310 may be separated by about 90 degrees. An optional secondary inspection table 316, which may facilitate inspections of larger articles 102, may be positioned 180 degrees with respect to a position facing pass station 306.

During an inspection, one or more articles 102 may be received at an inspection station 302, which may correspond to inspection station 104 described above with respect to FIG. 1. In particular, one or more articles 102 may initially be received at an inbound receiving station 304. The one or more articles 102 may be placed on a rack or other suitable support structure in inbound station 304. Once received, the one or more articles 102 may be evaluated against one or more inspection criteria (e.g., retirement criteria, local repair criteria, and inspector-driven repair criteria). This evaluation may be performed while the one or more articles 102 have been placed in a pass station 306 (and/or table 308 or secondary station 316, as desired) and before the one or more articles are transferred to article circulation 312. A multi-phase inspection may be performed with inspection processor 320 on one or more of these articles 102. When the inspection is performed on articles located at pass station 306, articles that fail a phase of the inspection may be removed from pass station 306 and relocated, if necessary (e.g., to fail/retire station 310 or remote repair station 314). Thus, at the end of the inspection, each of the articles 102 remaining within the pass station 306 may have been inspected and determined to pass every inspection point and are suitable to return to article circulation 312.

When an article 102 fails the one or more inspection criteria (e.g., one or more inspector-driven repair criteria), the failing article 102 may be placed on or adjacent to operator's table 308 for local repair. Local repair may include modifying at least one aspect of the article 102 with one or more items of inspection equipment 340. If local repair cannot be performed (e.g., the article 102 fails one or more retirement or local repair criteria), the one or more articles 102 may be transferred to the fail/retire station 310 for subsequent transfer to remote repair station 314 or to be removed from circulation. If, according to the inspector-driven repair criteria, the one or more articles 102 can be repaired at the operator's table 308, the one or more articles 102 may be transferred or returned to the pass station 306 following such repair.

In some aspects, fail/retire station 310 may include a plurality of separated sections, the sections being arranged in a predetermined manner with respect to table 308. For example, a position of fail/retire station 310 closest to table 308 may receive one or more articles 102 that require spotting treatment (e.g., articles 102 that failed a local repair criterion for the presence of a stain, spot, or that are dirty). Additional sections may also include, in sequence moving away from table 308: wrinkled articles, articles retired by a third party, articles having an odor, articles that fail one or more retirement criteria, articles that have a tear on a seam or need embellishment repair, and articles requiring a matching accessory (e.g., a belt) from a location outside of inspection station 302. In some aspects, tags for identifying these articles may include a feature indicative of the type of action required, if any, for groups of articles 102 at fail/retire station 310. For example, tags may include coding (e.g., one or more particular colors) representative of a reason the corresponding articles 102 require additional processing before being returned to circulation, or a reason the corresponding articles 102 should be retired. The type of action may be indicative of the failed criterion (or criteria), as well as the location of the defect.

Figure 4:
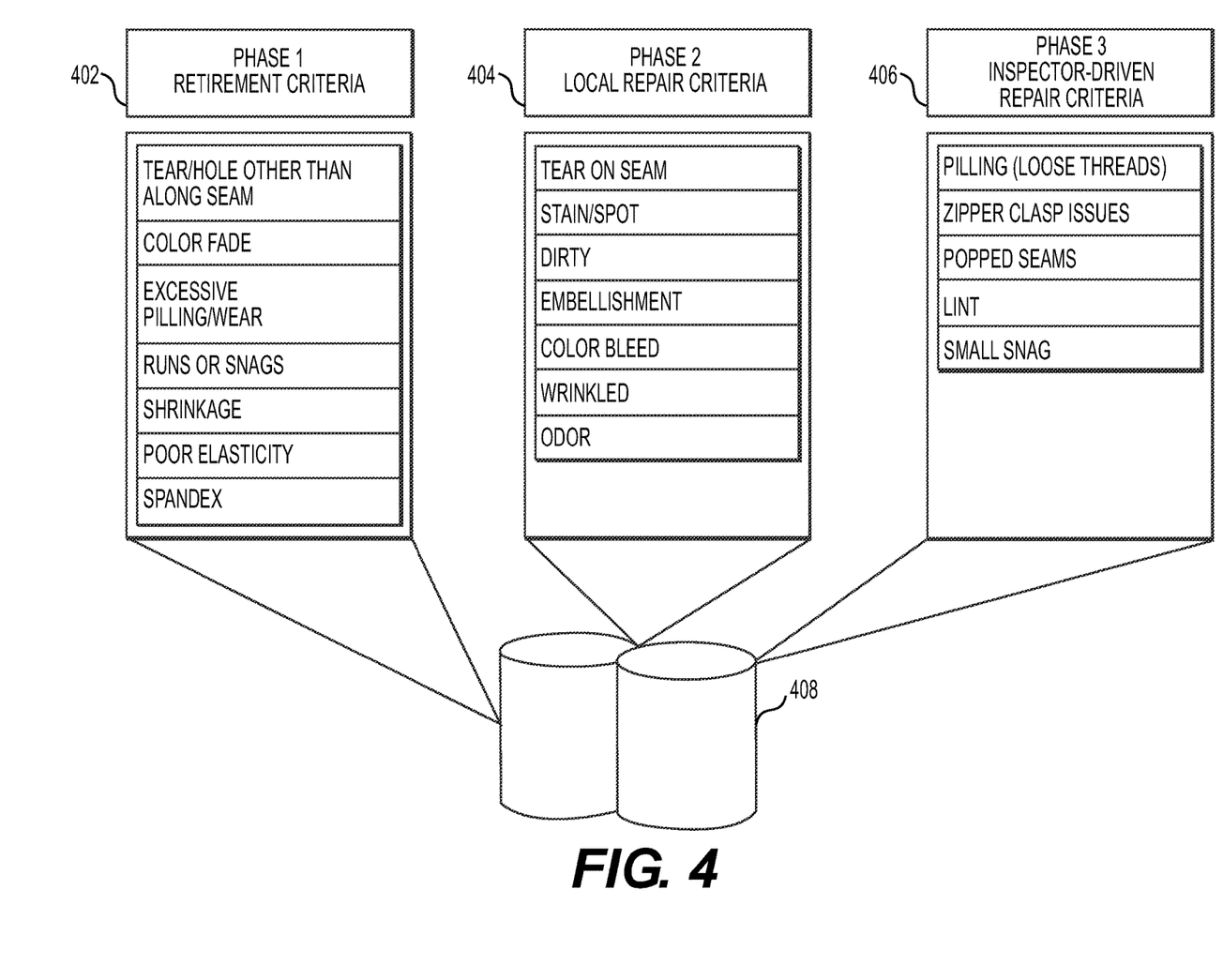
FIG. 4 is a chart illustrating a series of entries presented on the display by the inspection processing device and stored in a database according to an embodiment of the present disclosure.

FIG. 4 is a diagram illustrating a series of criteria that may be presented, as prompts and/or entries, on a display of inspection processor 320 and stored in a database (e.g., article inspection standards database 408), according to an embodiment of the present disclosure. Article inspection standards database 408 may be operatively connected, for example over network 504 (FIG. 5), with one or more components of inspection station 302, such as inspection processor 320. Information stored in article inspection standards database 408 may be accessible by inspection processor 320 in inspection station 302 via network 504, and may be added to, modified, or deleted by inspection processor 320, for example, by interacting with prompts presented by inspection processor 320 (e.g., touchscreen prompts, machine-readable codes that are read with reader 322, etc.).

Article inspection standards database 408 may form, or be a part of, an article tracking system that includes one or more storage devices that store article information, including article inspection criteria. Each storage device of article inspection standards database 408 may include one or more hard disk drives, solid state drives, flash memory, USB storage devices, or other non-transitory storage media configured to store datasets for a plurality of articles 102 based on a unique identifier associated with each article 102. Article inspection standards database 408 may include at least phase 1 retirement criteria 402, phase 2 local repair criteria 404, and phase 3 inspector-driven repair criteria 406. Although phase 1 retirement criteria 402, phase 2 local repair criteria 404, and phase 3 inspector-driven repair criteria 406, are illustrated as being a part of database 408, one or more storage device may be combined and shared across one or more additional databases in order store said data. Thus, when inspection stations 508 are located in multiple warehouses, all of the information contained in article inspection standards database 408 may be readily accessed by each inspection processor 320.

Data stored in article inspection standards database 408 and/or one or more data stores associated with inspection processor 320 may be configured to guide an inspector through an inspection in a manner that reduces or, in some cases eliminates, unnecessary inspection steps. First, the phase 1 retirement criteria 402 may be presented in an order that is based on the frequency at which each criterion results in a failure. For example, an inspection history may be accessed to determine, with inspection processor 320, a most common failure in phase 1, which may be presented first. Remaining phase 1 retirement criteria may be presented in sequence according to their frequency (e.g., in descending frequency with most frequent first). A similar ordered presentation of inspection criteria may guide the inspection through phase 2 and subsequently through phase 3. The frequency of failures associated with each inspection criterion may be determined over a particular period of time. In particular, the order of criteria within a particular phase (e.g., one of phases 1, 2, or 3) may be determined by inspection processor 320 for a period of time extending over a year, 10-months, 8-months, 6-months, or other suitable period. Additionally, the order at which individual inspection criteria of a particular phase are presented by inspection processor 320 may be updated dynamically based on changing historical data stored, for example, in inspection history storage 502C. This order may correspond to the above-described order of sections on fail/retire station 310, which may be similarly updated based on the order of training operations determined with inspections processor 320.

Figure 5:
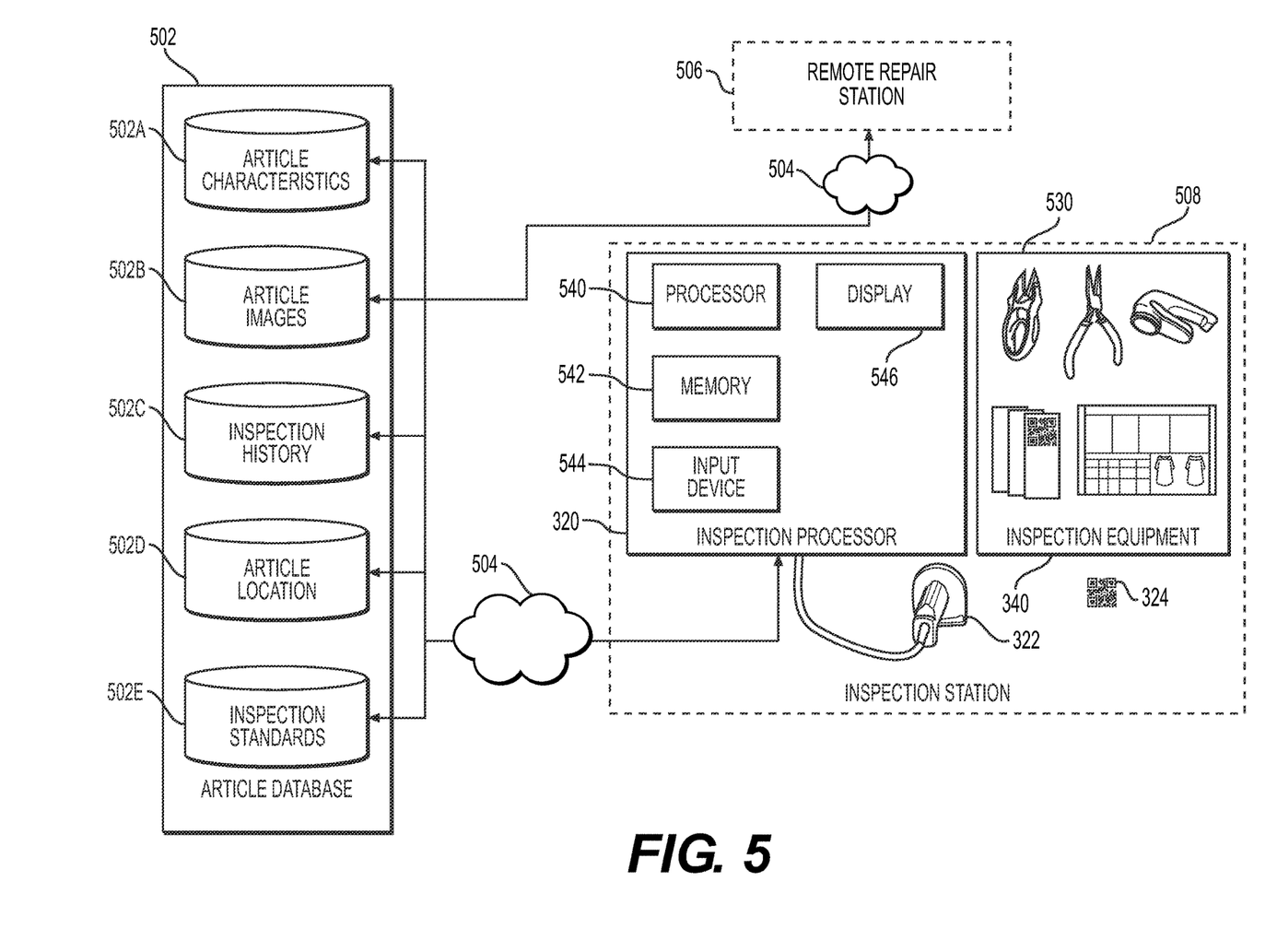
FIG. 5 is a block diagram illustrating an electronic network and environment according to an embodiment of the present disclosure.

FIG. 5 is a block diagram illustrating an article tracking system, including an article database 502 and inspection processing device 320 which may, in some embodiments, including one or more components of article database 502. Article database 502 may be used with inspection processing devices 320 in one or more inspection stations 508, which may correspond to inspection station 302. Article database 502 may be operatively connected, for example over network 504, with one or more inspection processors 320. In one aspect, network 504 may represent the Internet. However, in at least some configurations, network 504 may be a wired or wireless local network, or an intranet. Information stored in article database 502 is accessible by inspection processor 320 via network 504, and may be added to, modified, or deleted by inspection processor 320.

In an exemplary configuration, inspection processor 320 may include a suitable computing system configured for managing inspection procedures and/or training. Inspection processor 320 may include a processor 540, memory 542, input device 544, and display 564. Memory 542 of processing device 320 may store instructions that, when executed by one or more processors 540, allow processing device 320 to operate as discussed herein. While display 546 may be an I/O device such as a touchscreen display, additional I/O devices such as a mouse or keyboard may also be included as an input device 544. Inspection processor 320 may include a wired or wireless network interface configured to access article database 502 through a network 504.

Article database 502 may be a part of an article tracking system for monitoring one or more articles 102. Article database 502 may include one or more storage devices that store article information. Each storage device of article database 502 may be formed by one or more hard disk drives, solid state drives, flash memory, USB storage devices, or other non-transitory storage media. Article database 502 may include an article characteristics storage device 502A, article images storage device 502B, inspection history storage device 502C, article location storage device 502D, and article inspection standards storage 502E which may correspond to database 408 described above. Although each storage device is illustrated as a part of database 502, one or more storage device may be combined and shared across one or more additional databases, separated across network 504, etc.

Whether article database 502 is in communication with inspection processing device 320 by a global or local network 504, each inspection processing device 320 may access information stored in article characteristics storage device 502A, article images storage device 502B, inspection history storage device 502C, article location storage device 502D, and article inspection standards storage device 502E. When reader 322 reads an identifier 324, information encoded in the identifier 324 is output by reader 322 and received by inspection processor 320. This information may form the basis of a query sent from processing device 320 to article database 502. In response to the query, article database 502 may output, via network 504, information from one or more of the categories of information associated with the identifier 324 scanned, imaged, or otherwise read with reader 322.

The information output from article database 502 may include article characteristics stored in storage 502A. This information may include a source, category, style, color, size, etc. Article images storage 502B may include a photograph or stock image of the article 102. This image may represent an initial state of the article 102 when the article 18 is in new condition. Each image stored in image storage 502B may show an accessory such as a belt, neckwear, etc., that is associated with the article 102.

Inspection history storage 502C may include a complete history for every inspection performed on each article 102. The history may be stored in a generalized form (e.g., general pass/fail information) or may be more granular. For example, the inspection history stored in storage 502C may include inspection history for each article 102 according to criteria of phases 1, 2, and/or 3.

Location information of each article 102 may be stored in article location storage 502D. This location information may specify a location of the article 102 within a particular space, or may indicate that the article 102 is with a customer (e.g., by storing a unique user identification number associated with the customer). Thus, a detailed status of article 18 may be stored in article location storage 502D.

Inspection standards storage 502E may store one or more data sets useful for guiding an inspector through an inspection process. Inspection standards storage 502E may also be useful for guiding a training process for an inspector. Inspection standards storage 502E may allow inspection processor 320 to present prompts for each phase, and if desired, each individual criterion. Inspection standards storage 502E may allow inspection processor 320 to present one or more prompts to solicit inspection results for a plurality of phases, including a phase corresponding to one or more retirement criteria, a phase corresponding to one or more local repair criteria, and a phase corresponding to one or more inspector-driven repair criteria. Inspection processor 320 may also prompt an operator to input a physical location (e.g., arm, leg, interior, on seam, off seam, etc.) of the article 102 where a defect was observed.

In response to receiving the result of one or more points of inspection performed according to these prompts, inspection processor 320 may determine whether the article 102 may be returned to circulation, repair, or retired. This determination may be made by taking into account inspection history for the article, and/or attributes included in a profile of the article 102 stored in article characteristics storage 502A (e.g., a material of the article, whether the article requires a particular cleaning process such as dry cleaning, an indication from a third party that the article has been retired, etc.). This determination may also take into account the location (e.g., area or zone) of the article 102 where the defect was observed.

Information stored by article database 502 may be updated by inspection processor 320 in response to the output of reader 322 (e.g., in response to each individual inspection criterion described with respect to FIG. 4). For example, inspection processor 320 may update inspection history storage 502C based on the inspection result for one or more retirement criteria, one or more local repair criteria, and/or one or more inspector-driven criteria.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for dynamically managing an inspection of a plurality of wearable articles received with an inspection system, the method comprising:
    arranging an inspection layout comprising an inbound station, a pass station, an inspection station, and a fail station, wherein the inspection station is positioned at an oblique angle with respect to the pass station between the pass station and the fail station, wherein the inspection layout comprises a first position and a second position, where at the first position at least one incoming article is determined to require no repair, where at the second position at least one article is determined to need repair or is failed or is retired and removed from circulation;
    receiving one or more wearable articles such that at least one wearable article of the one or more wearable articles is accessible from the first position and determining that no repair is needed for the at least one wearable article of the one or more wearable articles;
    receiving the one or more wearable articles at the second position that includes an inspection processor and the inspection station supporting at least one item of inspection equipment, wherein the inspection station, the pass station, and the fail station surround the second position when an operator interacts with the inspection processor at the second position;
    inspecting the one or more wearable articles in view of one or more repairability criteria presented on a display connected to the inspection station;
    inspecting the one or more wearable articles in view of one or more local repair criteria presented on the display connected to the inspection station;
    inspecting the one or more wearable articles in view of one or more inspector-driven criteria presented on the display connected to the inspection station;
    determining an action type for the one or more wearable articles based on the one or more local repair criteria or the one or more inspector-driven criteria, the action type including at least one of determining an inspection failure or a passed inspection; and
    updating inspection history data stored in an inspection database in communication with the inspection processor based on the one or more repairability criteria, the one or more local repair criteria, and/or the one or more inspector-driven criteria.

2. The method of claim 1, further comprising:
    performing an action according to the action type, the action type including on-site repair of the at least one wearable article of the one or more wearable articles at a location other than the inspection station, based on the one or more inspector-driven criteria; and
    returning the at least one wearable article to circulation as part of a service for providing the at least one wearable article for temporary use by one or more subscribing users.

3. The method of claim 1, wherein the one or more local repair criteria is indicative of whether an on-site repair action is necessary for the at least one wearable article.

4. The method of claim 1, wherein the one or more local repair criteria is presented after the one or more repairability criteria.

5. The method of claim 1, wherein the display is positioned, connected to the inspection station, between one or more wearable articles awaiting inspection and the inspection station supporting the at least one item of inspection equipment.

6. The method of claim 5, further comprising:
    using a reader positioned on the inspection station to input an inspection result according to the one or more repairability criteria, the one or more local repair criteria, and/or the one or more inspector-driven criteria.

7. The method of claim 1, wherein the inspection station includes a failed articles station that receives one or more wearable articles that fail the repairability criteria or the local repair criteria, the operation position being between the pass station and the fail station, and the method further includes transferring the one or more wearable articles to the pass station, transferring the one or more wearable articles to the fail station, and/or modifying the one or more wearable articles at the inspection station.

8. The method of claim 1, wherein the inspection equipment includes equipment configured to input an inspection result for each of the one or more repairability criteria, the one or more local repair criteria, and the one or more inspector-driven criteria.

9. The method of claim 8, wherein the inbound station includes inspection equipment adjacent to the inspection processor and configured to modify the one or more wearable articles based on the inspection result for the one or more inspector-driven repair criteria.

10. An inspection system comprising:
    an inspection processor for dynamically managing data associated with inspections of one or more wearable articles, the inspection processor comprising:
        a memory having processor-readable instructions stored therein; and
        at least one processor configured to access the memory and execute the processor-readable instructions, which when executed by the at least one processor configures the at least one processor to perform a plurality of functions, including functions for:
            presenting one or more repairability criteria to guide an inspection of one or more wearable articles;
            presenting one or more local repair criteria to guide the inspection of the one or more wearable articles;

presenting one or more inspector-driven criteria to guide the inspection of the one or more wearable articles;

determining an action type for the one or more wearable articles, based on the one or more local repair criteria and/or the one or more inspector-driven criteria, the action type including at least one of determining an inspection failure or a passed inspection; and updating inspection history data stored in an inspection database in communication with the inspection processor based on the one or more repairability criteria, the one or more local repair criteria, and/or the one or more inspector-driven criteria;

an inspection layout comprising an inbound station, a pass station, an inspection station, and a fail station, wherein the inspection station is positioned at an oblique angle with respect to the pass station between the pass station and the fail station, wherein the inspection layout comprises a first position and a second position, where at the first position at least one incoming article is determined to require no repair, where at the second position at least one article is determined to need repair or is failed or is retired and removed from circulation.

11. The system of claim 10, wherein the functions further comprise:
receiving a result of an action according to the action type, the action type including on-site repair of at least one wearable article of the one or more wearable articles performed at a location other than the inspection station, based on the one or more inspector-driven criteria; and
updating an article location storage of the inspection database for returning the at least one wearable article of the one or more wearable articles to circulation as part of a service for providing the at least one wearable article for temporary use by one or more subscribing users.

12. The system of claim 10, wherein the one or more local repair criteria is indicative of whether an on-site repair action is necessary for at least one wearable article of the one or more wearable articles.

13. The system of claim 10, wherein the one or more local repair criteria is presented after the one or more repairability criteria.

14. The system of claim 10, further comprising:
a display connected to the inspection station, between one or more wearable articles awaiting inspection and the inspection station supporting at least one item of inspection equipment.

15. The system of claim 14, further comprising:
a reader positioned on the inspection station and configured to generate an inspection result according to the one or more repairability criteria, the one or more local repair criteria, and/or the one or more inspector-driven criteria.

16. An inspection system comprising:
a non-transitory computer-readable medium containing instructions, the instructions, when executed by a processor, causing the processor to act as an inspection processor and to perform steps comprising:
presenting one or more repairability criteria to guide an inspection of one or more wearable articles;
presenting one or more local repair criteria to guide the inspection of the one or more wearable articles;
presenting one or more inspector-driven criteria to guide the inspection of the one or more wearable articles;
determining an action type for the one or more wearable articles based on the one or more local repair criteria or the one or more inspector-driven criteria, the action type including at least one of determining an inspection failure or a passed inspection; and
updating inspection history data stored in an inspection database in communication with the inspection processor based on one or more repairability criteria, the one or more local repair criteria, and/or the one or more inspector-driven criteria;
an inspection layout comprising an inbound station, a pass station, an inspection station, and a fail station, wherein the inspection station is positioned at an oblique angle with respect to the pass station between the pass station and the fail station, wherein the inspection layout comprises a first position and a second position, where at the first position at least one incoming article is determined to require no repair, where at the second position at least one article is determined to need repair or is failed or is retired and removed from circulation.

17. The inspection system of claim 16, wherein the steps further comprise:
receiving a result of an action according to the action type, the action type including on-site repair of at least one wearable article of the one or more wearable articles performed at a location other than the inspection station, based on the one or more inspector-driven criteria; and
updating an article location storage of the inspection database for returning the at least one wearable article to circulation as part of a service for providing the at least one wearable article for temporary use by one or more subscribing users.

18. The inspection system of claim 16, wherein the one or more local repair criteria is indicative of whether an on-site repair action is necessary for the at least one wearable article.

19. The inspection system of claim 16, wherein the one or more local repair criteria is presented after the one or more repairability criteria.

20. The inspection system of claim 16, further comprising a display connected to the inspection station, between one or more wearable articles awaiting inspection and an inspection structure supporting at least one item of inspection equipment and/or the inspection processor.

* * * * *